(12) United States Patent
Ume

(10) Patent No.: US 6,650,834 B2
(45) Date of Patent: Nov. 18, 2003

(54) CAMERA TO WHICH EXTERNAL STROBE DEVICE IS DETACHABLY ATTACHABLE

(75) Inventor: Kazuhiro Ume, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/207,723

(22) Filed: Jul. 29, 2002

(65) Prior Publication Data

US 2003/0026606 A1 Feb. 6, 2003

(30) Foreign Application Priority Data

Aug. 20, 2001 (JP) ........................................ 2001-234385

(51) Int. Cl.⁷ .............................................. G03B 15/05
(52) U.S. Cl. ........................................ 396/164; 348/371
(58) Field of Search ................................. 396/164, 163, 396/203, 205, 206, 201, 159–162; 348/370, 371

(56) References Cited

U.S. PATENT DOCUMENTS 3,601,022 A * 8/1971 Langnau ..................... 396/162
4,951,081 A * 8/1990 Hosomizu et al. .......... 396/164

* cited by examiner

Primary Examiner—W. B. Perkey
(74) Attorney, Agent, or Firm—Robin, Blecker & Daley

(57) ABSTRACT

A camera to which an external strobe device is detachably attachable is disclosed. The camera has an operational member for setting an emission intensity of the external strobe device through an operation by a photographer, and an instructing unit for instructing a set signal set by the operational member to the strobe device.

14 Claims, 3 Drawing Sheets

CAMERA TO WHICH EXTERNAL STROBE DEVICE IS DETACHABLY ATTACHABLE

BACKGROUND OF THE INVENTION

1. Field of the Invention

The present invention relates to an improvement in a camera or a camera system composed of a camera and an external strobe device in combination thereof.

2. Related Background Art

In photographing a static image using an external strobe device, there are cases where a stroboscopic emission intensity is to be set to an arbitrary level depending on a photographing mode or the like.

However, it is conventionally impossible to set the stroboscopic emission intensity arbitrarily unless the external stroboscopic device has a function for setting the intensity of emission.

SUMMARY OF THE INVENTION

An object of the present invention is to provide a camera system and a camera in which a stroboscopic emission intensity may be set arbitrarily by the operation of the camera even if an external strobe device has no function for setting the intensity of emission.

According to the present invention, there is provided a camera to which an external strobe device is detachably attachable, characterized by including: an operational member for setting an emission intensity of the external strobe device through an operation by a photographer; and instructing means for instructing a set signal set by the operational member to the strobe device.

Also, the camera may include a mode selection member for selecting a plurality of photographing modes including a manual photographing mode, and an emission intensity of the strobe device may be set by the operational member in the manual photographing mode.

Also, in the camera, an emission intensity inherent in the external strobe device may be set by the operation of the operational member.

Also, in the camera, the operational member produces a signal relating to a proportion to a full emission intensity of the strobe device.

Also, in the camera, a signal relating to a full emission intensity of the strobe device is produced in accordance with an operational condition of the operational member.

Also, according to the present invention, there is provided a camera system, characterized by including: a strobe device detachably attachable to a camera body; an operational member for setting an emission intensity of the strobe device by operation by a photographer; and instruction means for instructing a set signal set by the operation member to the strobe device.

In the camera system, in particular, the strobe device controls the stroboscopic emission intensity on the basis of the set signal set by the operational member only in the case where, when the strobe device has a function to make it possible to set the stroboscopic emission intensity of the strobe device arbitrary, the stroboscopic emission intensity of the strobe device is not set in the strobe device.

Also, in the camera system, the camera includes: an appropriate emission intensity calculating circuit for calculating an emission intensity of the strobe device; and a setting operational member for setting a correction amount of the calculated appropriate emission intensity value of the appropriate emission intensity calculating circuit, the setting operational member and the operational member being the same member.

Also, in the camera system, the camera includes a mode selection member for selecting a plurality of photographing modes including a manual photographing mode and an emission intensity of the strobe device may be set by the operational member in the manual photographing mode.

Also, in the camera system, an emission intensity inherent in the external strobe device may be set by the operation of the operational member.

Also, in the camera system, the operational member produces a signal relating to a proportion to a full emission intensity of the strobe device.

Also, in the camera system, a signal relating to a full emission intensity of the strobe device is produced in accordance with an operational condition of the operational member.

DESCRIPTION OF THE PREFERRED EMBODIMENTS

An embodiment of the present invention will now be described in detail with reference to the accompanying drawings.

Figure 1:
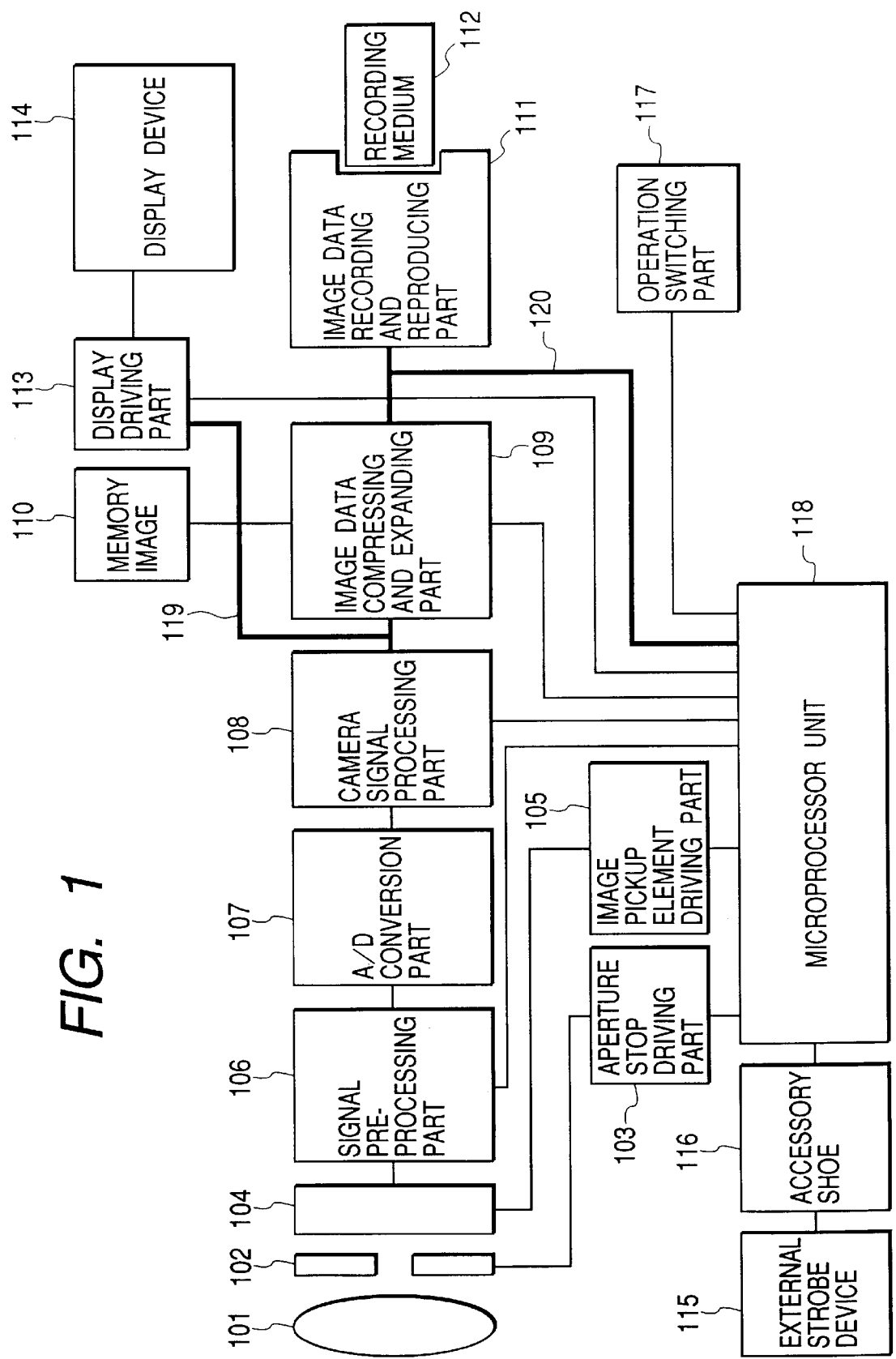
FIG. 1 is a block diagram showing an electric structure of a camera according to an embodiment of the present invention.

FIG. 1 is a block diagram showing a circuit structure of a camera according to an embodiment of the present invention.

In the drawing, there is shown an image pickup lens 101, an aperture stop mechanism part 102 serving both as an element used for limiting an incident light amount and as a shutter, an aperture stop driving portion 103 for driving the aperture stop mechanism part 102, a two dimensional image pickup element 104 that may be represented by a CCD or C-MOS sensor, an image pickup element driving part 105 for driving the image pickup element 104, a signal preprocessing part 106 for performing relative double sampling or an AGC (Automatic Gain Control), an A/D conversion part 107 for digitizing an analog signal, a camera signal processing part 108 for processing the digitized signal, an image data compression and expanding part 109 for compressing and expanding the image data, an image memory 110, a data recording and reproducing part 111 for recording and reproducing the compressed image data, a recording medium 112 that may be represented by a semiconductor memory or the like, a display driving part 113 for driving a display device to be described later, and a display device 114 that is represented by a liquid crystal display or a CRT. Reference numeral 115 denotes an external strobe device that is known as an accessory for a silver halide camera and attached through an accessory shoe 116, numeral 117 denotes an operational switch part in which a shutter button for imparting a recording start trigger and the like are arranged, numeral 118 denotes a microprocessor unit (hereinafter referred simply to as an MPU) for performing the control of a series of operations, numeral 119 denotes a first image data bus, and numeral 120 denotes a second image data bus.

The operation of the camera with the above arrangement will now be described.

In the case where there is a sufficient amount of illumination for image taking a subject, a flux of light passing through the image pickup lens 101 is controlled to a suitable exposure by means of the aperture stop mechanism part 102 and is subjected to a photoelectric conversion by means of the image pickup element 104. The accumulation time of electric charge in the image pickup element 104 is controlled by means of the image pickup element driving part 105. In the signal pre-processing part 106, the relative double sampling and the gain control are performed. In the A/D conversion part 107, the signal is converted from the analog signal to the digital signal. The digitalized signal is subjected to an automatic white balance, an outline emphasis or the like in the camera signal processing part 108. The signal processed in the camera signal processing part 108 is transmitted to the MPU 118 to perform the feedback control on the basis of this signal.

In any of the above-described aperture stop control, charge accumulation time control and gain control, the MPU 118 performs the gain control of the aperture stop driving part 103, the image pickup element control part 105 and the signal pre-processing part 106 so that the signal to be inputted into the MPU 118 becomes a suitable value.

The signal processed in the camera signal processing part 108 is fed to the display driving part 113 through the first image data bus 119 and the pickup image is displayed on the display device 114 in real time. At the same time, when the trigger of the recording start is inputted from the operational switch part 117, the MPU 118 sets the aperture stop mechanism part 102 to a stop value for photographing by the aperture stop driving part 103 and set the signal pre-processing part 106 to a sensitivity for photographing.

Also, the MPU closes up the aperture stop mechanism part 102 at the accumulation time for photographing by means of the aperture stop driving part 103 to be set so as to perform the shutter operation. Thereafter, the exposure is performed for the accumulation time period set by the pickup element 104. A emission instruction signal that is in synchronism with the start or the end of this exposure period is fed to the external strobe device 115 through the accessory shoe 116 and the external strobe device 115 emits light. The aperture stop mechanism part 102 is closed up at the termination of the accumulation time period to stop the light. An image signal read out during the stop is converted from the analog signal to the digital signal in the A/D conversion part 107 and fed to the image data compressing and expanding part 109 through the camera signal processing part 108. The image data compressing and expanding part 109 stores the image data in the image memory 110 once, compresses the image data in order in the format of JPEG or the like and outputs the image data to the data recording and reproducing part 111 through the second image data bus 120, whereby the above-described image data are recorded to the recording medium 112 such as the semiconductor memory.

During the reproduction, the image data are read out from the recording medium 112 by means of the recording and reproducing part 111, fed to the compressing and expanding part 109 through the second image data bus 120. The image data expanded here are stored in the image memory 110, fed to the display driving part 113 through the first image data bus 119 and reproduced as an image on the display device 114.

The relationship between the external strobe device 115 and the camera will now be described.

Normally, the MPU 118 calculates an emission intensity that is needed for photographing (emission) according to the fixed light and an increment of the image signal obtained by performing pre-emission of the external strobe device 115, and serially communicates the emission intensity through the accessory shoe 116 provided with an electric contact to thereby perform the automatic emission adjustment for emitting light based on the emission intensity calculated for exposure.

However, there is a demand for determining a guide number according to a distance to the subject and a stop value of the camera (F-number) as a stationary intensity emission in which the emission intensity is represented as the guide number instead of the automatic emission adjustment. For example, this is the case where, if the photographing mode of the camera is set to the manual mode or an aperture stop priority mode, the aperture stop mechanism part 102 is fixed and the guide number of the external strobe device 115 is set according to the stop value (F-number) and the distance to the subject. If a stationary intensity emission function that is generally called as a manual emission mode is provided in the external strobe device 115 per se, it is sufficient to utilize this function. However, in the case where the stationary intensity emission function is not provided in the external strobe device 115, it is conventionally impossible to realize the stationary intensity emission.

Thus, according to this embodiment, the stationary emission intensity is set by the operation from the operational switch part 117. The MPU 118 instructs the stationary intensity emission to the external strobe device 115 to thereby make it possible to perform the stationary intensity emission.

Figure 2:
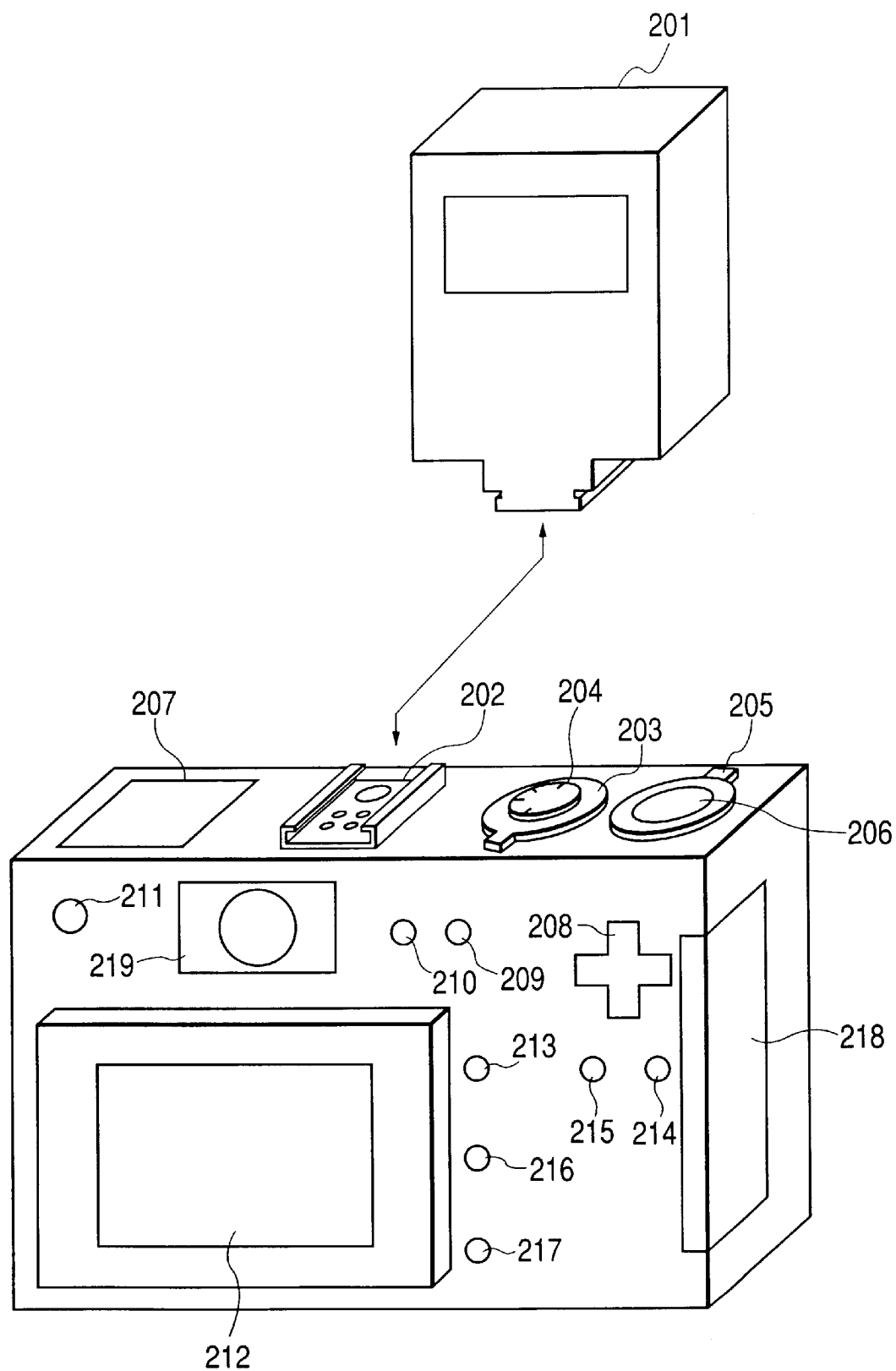
FIG. 2 is a view showing an arrangement of an operating member provided in the camera shown in FIG. 1.

FIG. 2 is an arrangement view showing the operational member on the back surface of the camera. Hereinafter, the cameral operational member and the like according to this embodiment will be described in detail with reference to FIG. 2.

Reference numeral 201 denotes the external strobe device (corresponding to the member 115 shown in FIG. 1) to be attached to the camera body, and numeral 202 denotes the accessory shoe (corresponding to the member 116 in FIG. 1) for the connection of the camera body with the external strobe device 210. Reference numeral 203 denotes a main dial for switching over among a power source turning-off, a camera recording mode, and a reproducing mode. Reference numeral 204 denotes a mode dial for switching over among an automatic mode, a program mode, an aperture stop priority mode, a shutter speed priority mode, a manual mode, and the like. Reference numeral 205 denotes a zoom lever for operating a zoom lens, numeral 206 denotes a shutter button for giving the photographing trigger to the camera, and numeral 207 denotes a display panel for displaying the set condition of the camera. Numeral 208 denotes a cross button for adjusting the set amount in each set mode, that makes it possible to detect which part among upper, lower, right, and left portions is depressed. Numeral 209 denotes a macro button for performing the macro photographing, numeral 210 denotes a photometry switching button for switching the photometry methods of the camera, and numeral 211 denotes a emission prohibiting button of an internal strobe (not shown) incorporated in the camera body. In the case where the external strobe device 201 is attached to the camera, the internal strobe does not function because its emission is prohibited.

Numeral 212 denotes a liquid crystal finder. (corresponding to the member 114 in FIG. 1) for displaying the reproduced image and the live image by the camera. Numeral 213 denotes an AF/FE lock button for locking an AF condition upon the strobe non-emission setting and an FE lock upon the strobe lighting setting when depressing the button. Numeral 214 denotes a menu button for displaying a camera setting menu on the liquid crystal finder 212. The change of the items within the menu is performed by the cross button 208. Numeral 215 denotes a set button for determining the selected item from the menu by the menu button 214 and the cross button 208. Numeral 216 denotes a correction menu button for displaying exposure correction, white balance correction, and a strobe emission intensity correction menu on the liquid crystal finder 212 in order by the depression of the button. The set of the correction amount is performed by the cross button 208. Numeral 217 denotes a display button for switching over the display information of the liquid crystal finder 212 and for stopping the image display if necessary, numeral 218 denotes a memory slot to which the semiconductor memory is attached, and numeral 219 denotes an optical viewfinder.

According to this embodiment, in the case where the external strobe device 201 is attached, the camera recording mode is set by the main dial 203 and the manual mode is set as the photographing mode by the mode dial 204, the stationary intensity emission is to be performed. In the case where the mode other than the manual mode is selected by the mode dial 204, the above-described automatic emission adjustment is performed.

In case of the automatic emission adjustment, correction of the emission intensity is possible and the correction of the emission intensity in a plus/minus direction calculated by the camera is possible by the strobe emission intensity adjustment by the correction menu button 216. Also, in case of the stationary intensity emission, the correction of the stationary intensity emission in a plus/minus direction is possible by the operation of the correction menu button 216, and if the maximum correction in the plus direction is performed, the full intensity emission is performed at the guide number possessed by the external strobe device 201. Incidentally, every time the correction button is depressed, the correction value is changed by one-third stage. Also, this correction value is displayed on the liquid crystal finder 212.

In this embodiment, it is possible to set the correction of the strobe emission intensity by one third stage up to ±2nd stage by the correction menu button 216. Upon the automatic emission adjustment, the external strobe device 201 emits light at the emission intensity according to the calculated value at the correction of zero, at the emission intensity four times greater than the calculated value at the +2nd stage correction, and at the emission intensity one fourth emission intensity of the calculated value at the −2nd stage correction. Also, in the stationary intensity emission for the manual photographing, the external strobe device 201 emits light at the emission intensity of one fourth of the full emission intensity at the zero correction, at the emission intensity four times greater than that of the above-described zero correction at the +2nd stage correction (full lighting), and at the emission intensity of the −2 stage correction which is one fourth of the above-described zero correction at the −2nd stage correction. Namely, under the condition that the correction button is not depressed in the manual photographing mode with the strobe attached, the camera feeds to the strobe the command signal for one fourth emission intensity of the full emission intensity of the strobe. Also, when the +2nd stage correction is performed, the camera feeds the signal of the full emission intensity to the strobe. Thus, the camera feeds to the strobe the signal relating to the proportion to the full emission intensity that is inherent in the strobe device or the signal representative of the full emission intensity of the strobe device.

As described above, the correction operation of the strobe emission intensity by the correction menu button 216 is the same operation both in the automatic emission adjustment and the stationary intensity emission. Also, in the case where the external strobe device 201 per se has the emission intensity correction function, if the emission intensity correction from the external strobe device 201 and the emission intensity correction from the camera body are set so as to be duplicated, the emission intensity correction from the camera body is made effective only for the case where the emission intensity correction on the external strobe device 201 is at zero both in the automatic emission adjustment and the stationary intensity emission, and the emission intensity correction of the external strobe device 201 is made effective if the emission intensity correction of the external strobe device 201 is other than zero.

Figure 3:
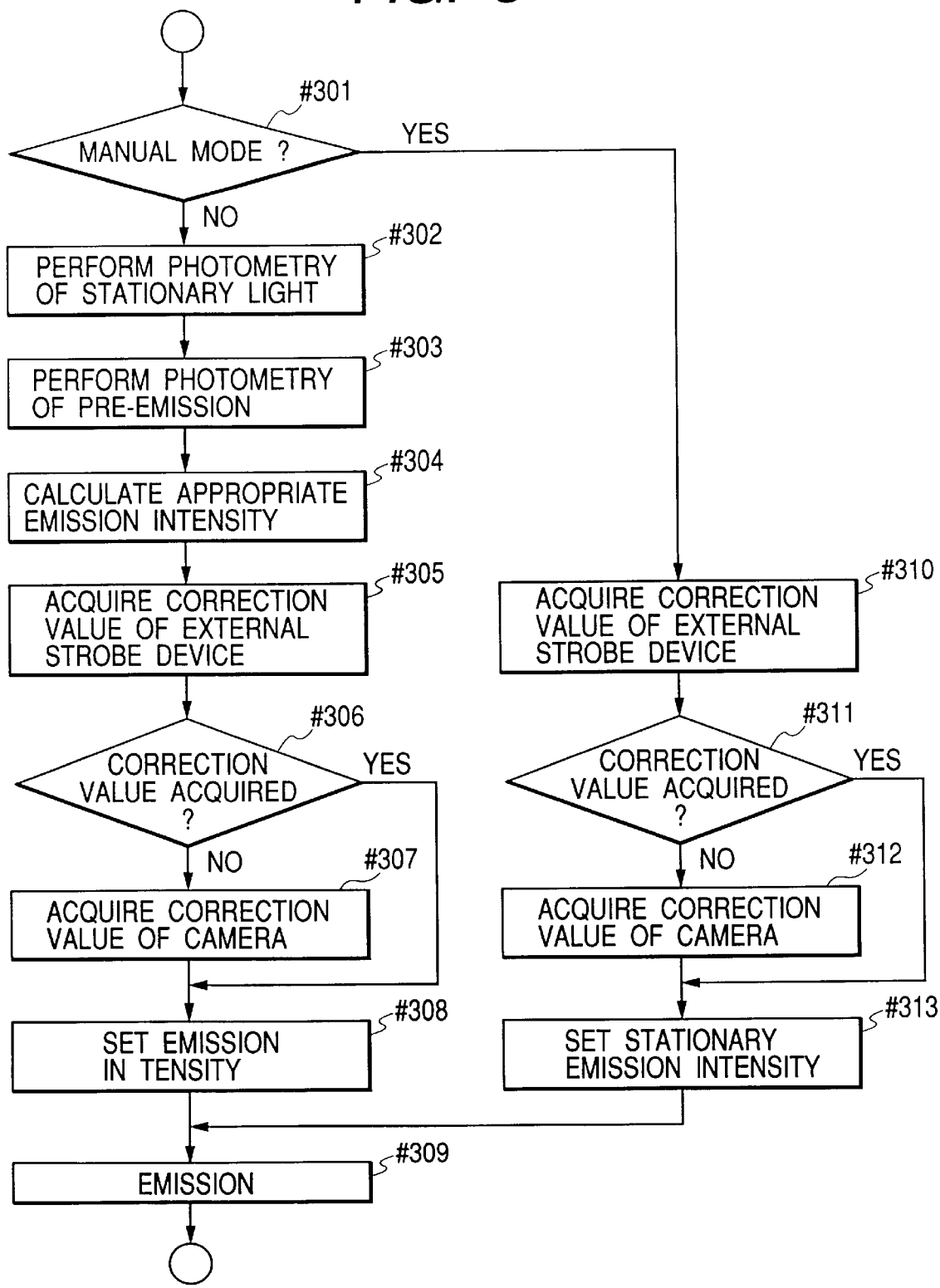
FIG. 3 is a flowchart showing an operation of a primary part of the camera shown in FIG. 1.

The operation will now be described with reference to the flowchart of FIG. 3.

When the shutter button 206 of FIG. 2 is depressed, the camera starts the photographing operation. First of all, in the step 301, the determination of the photographic mode is performed. If the photographing mode other than the manual mode is set, the operation enters the step 302 for performing the automatic emission adjustment. In the step 302, the photometry of the fixed light is performed, and in the next step 303, the photometry of the increment of the emission intensity by the pre-emission of the external strobe device 201 is performed. In the next step 304, the calculation of the appropriate emission intensity (appropriate emission intensity calculation) for the automatic emission adjustment from the above-described two photometric values is performed. It is possible to correct the emission intensity thus obtained as described above. In the next step 305, in the case where the external strobe device 210 has the emission intensity correction function, the correction value is obtained from the external strobe device 201. Then, in the step 306, it is determined whether the strobe correction value is set. If the correction value is set, the operation immediately enters the step 308 for making the correction value effective (skipping the step 307). Here, the correction is effected to the calculated appropriate emission intensity value so as to set the emission intensity.

Also, in the case where it is determined in the above-described step 306 that the strobe correction value is zero, the operation enters the step 307 where the correction value by the operation of the correction menu button 216 is acquired (acquiring the correction value of the camera). In order to make the correction value effective, in the next step 308, the emission intensity is set by correcting the calculated appropriate emission intensity value.

After the emission intensity is set in the step 308, the operation enters the step 309 where the main emission is performed in synchronism with the shutter according to the set emission intensity.

On the other hand, in the case where the manual mode is set as the photographing mode in the above-described step 301, the operation enters the step 310 for performing the stationary intensity emission according to the present embodiment. Then, in the case where the external strobe device 201 has the emission intensity correction function, the correction amount is obtained from the external strobe device 201, in the following step 311, it is determined whether or not the strobe correction value is set, if the correction value is set, the operation immediately enters the step 313 for making the correction value effective (skipping the step 312), and in the step 313, the stationary emission intensity is calculated and set on the basis of the above-described correction value.

Also, in the case where it is determined in the above-described step 311 that the strobe correction value is zero, the operation enters the step 312 where the correction value (correction signal) by the operation of the correction menu button 216 is received by the strobe from the camera body. In order to make the correction value effective, in the next step 313, are the stationary emission intensity calculated and set on the basis of the correction value. Of course, when the strobe receives the command signal from the camera body, the full intensity emission is set. Thus, the camera copes with the full intensity emission to the strobe device.

Thereafter, the operation enters the step 309 in the same manner as in the automatic intensity adjustment and the emission is performed in synchronism with the shutter according to the set stationary emission intensity.

Incidentally, in this embodiment, in the case where the photographing mode of the camera is the manual mode, the stationary intensity emission is performed. However, it is possible to provide a switch for the stationary intensity emission designation discretely to the camera and to designate the stationary intensity emission at all times irrespective of the photographing mode of the camera.

Also, in the case where the photographing mode is the manual mode, the stationary intensity emission is performed. However, this may apply to the case where the photographing mode is the aperture stop priority mode.

Furthermore, in a photographing mode other than the manual photographing mode, an item for selecting on state or off state of strobe automatic emission adjustment may be added in the menu. In this case, after determining no in step 301, the setting value of strobe automatic emission adjustment is referred. If it is determined that the off state is selected, the operation enters the step 310. Such operation makes it possible to selectively set by the user the emission intensity in the photographing mode other than the manual photographing mode.

Also, the invention is applied to the camera using the image pickup element as the recording medium. However, the invention is not limited to this but may be applied to the silver halide camera.

As described above, according to the present invention, even if the external strobe device has no function to set the emission intensity, it is possible to provide the camera system or the camera that may arbitrarily set the stroboscopic emission intensity by the operation of the camera.

What is claimed is:

1. A camera to which an external strobe device is detachably attachable, comprising:
   a mode selection member which selects a plurality of photographing modes including a predetermined photographing mode;
   an operational member for making it possible to set an emission intensity of the external strobe device through an operation by a photographer, in case of only selecting said predetermined photographing mode; and
   instructing means which instructs a set signal set by said operational member to the strobe device.

2. A camera according to claim 1, wherein said predetermined photographing mode a manual photographing mode.

3. A camera according to claim 1, wherein an emission intensity inherent in the external strobe device is set by the operation of said operational member.

4. A camera according to claim 3, wherein said operational member produces a signal relating to a proportion to a full emission intensity of the strobe device.

5. A camera according to claim 3, wherein a signal relating to a full emission intensity of the strobe device is produced in accordance with an operational condition of said operational member.

6. A camera system comprising:
   a strobe device detachably attachable to a the camera body;
   a mode selection member which selects a plurality of photographing modes including a predetermined photographing mode;
   an operational member for making it possible to set an emission intensity of the external strobe device through operation by a photographer, in case of only selecting said predetermined photographing mode; and
   instructing means which instructs a set signal set by said operation member to said strobe device.

7. A camera system comprising:
   a strobe device detachably attachable to a camera body;
   an operational member for setting an emission intensity of said strobe device through operation by a photographer;
   instructing means which instructs a set signal set by said operation member to said strobe device; and
   wherein said strobe device controls the stroboscopic emission intensity on the basis of the set signal set by said operational member only in the case where, when said strobe device has a function to make it possible to set the stroboscopic emission intensity of said strobe device arbitrarily, the stroboscopic emission intensity of said strobe device is not set in said strobe device.

8. A camera system according to claim 6, wherein said camera comprises: an appropriate emission intensity calculating circuit for calculating an emission intensity of said strobe device; and a setting operational member for setting a correction amount of the calculated appropriate emission intensity value of said appropriate emission intensity calculating circuit, said setting operational member and said operational member being the same member.

9. A camera system according to claim 6, wherein said predetermined photographing mode a manual photographing mode.

10. A camera system according to claim 6, wherein an emission intensity inherent in said external strobe device is set by the operation of said operational member.

11. A camera system according to claim 6, wherein said operational member produces a signal relating to a proportion to a full emission intensity of said strobe device.

12. A camera system according to claim 6, wherein a signal relating to a full emission intensity of said strobe device is produced in accordance with an operational condition of said operational member.

13. A camera to which an external strobe device is detachably attachable, comprising:
   a switch member for selecting whether a stationary emission intensity is designated;
   an operational member for making it possible to set an emission intensity of the external strobe device through an operation by a photographer, in case of only selecting that the stationary emission intensity is designated by said switch member; and instructing means which instructs a set signal set by said operational member to the strobe device.

14. A camera system comprising:

a strobe device detachably attachable to the camera body; and a camera body comprising;
- a switch member for selecting whether a stationary emission intensity is designated;
- an operational member for making it possible to set an emission intensity of the external strobe device through an operation by a photographer, in case of only selecting that the stationary emission intensity is designated by said switch member, and
- instructing means which instructs a set signal set by said operational member to said strobe device.

* * * * *

UNITED STATES PATENT AND TRADEMARK OFFICE
CERTIFICATE OF CORRECTION

PATENT NO. : 6,650,834 B2
APPLICATION NO. : 10/207723
DATED : November 18, 2003
INVENTOR(S) : Ume It is certified that error appears in the above-identified patent and that said Letters Patent is hereby corrected as shown below:

Column 7, line 67, delete "mode a manual" and insert -- mode is a manual. --

Column 8, line 12, delete "to a the camera" and insert -- to the camera --

Signed and Sealed this

Twenty-fifth Day of July, 2006

JON W. DUDAS
*Director of the United States Patent and Trademark Office*